(12) United States Patent
Dandekar et al.

(10) Patent No.: US 8,373,383 B2
(45) Date of Patent: Feb. 12, 2013

(54) SMART CART TO AUTOMATICALLY MANAGE PORTABLE INFORMATION HANDLING SYSTEMS

(75) Inventors: Shree Dandekar, Round Rock, TX (US); David Douglas, Austin, TX (US); Gary Verdun, Georgetown, TX (US); Gregory Dvorak, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 686 days.

(21) Appl. No.: 12/578,043

(22) Filed: Oct. 13, 2009

(65) Prior Publication Data

US 2011/0084666 A1    Apr. 14, 2011

(51) Int. Cl.
*H02J 7/00*    (2006.01)
(52) U.S. Cl. ........ 320/107; 320/109; 320/110; 320/115; 320/137
(58) Field of Classification Search .................. 320/107, 320/109, 110, 111, 115, 137
See application file for complete search history.

(56) References Cited

U.S. PATENT DOCUMENTS

| | | | | |
|---|---|---|---|---|
| 7,130,190 | B1* | 10/2006 | Baker | 361/695 |
| 2002/0073349 | A1* | 6/2002 | Turner et al. | 713/340 |
| 2003/0225596 | A1* | 12/2003 | Richardson et al. | 705/2 |
| 2008/0071483 | A1* | 3/2008 | Eaves | 702/63 |

OTHER PUBLICATIONS

Independent Reporters, Cart Services by Independent Reporters, http://www.indreporters.com/cart.htm, printed Feb. 24, 2010.

\* cited by examiner

*Primary Examiner* — Samuel Berhanu
(74) *Attorney, Agent, or Firm* — Hamilton & Terrile, LLP; Stephen A. Terrile

(57) ABSTRACT

A smart cart for automatically managing a plurality of information handling systems. The system provides a plurality of functions. For example, in certain embodiments, the system provides one or more of security authentication for distributing the notebooks, automatic asset tracking functionality; identification of notebook charge status; provides identification of asset information (e.g., an asset tag number, a serial number or a computer name); network access to push patch updates at night when units are not in use; and charging control to optimize system availability and prevent AC input circuit overload.

12 Claims, 4 Drawing Sheets

SMART CART TO AUTOMATICALLY MANAGE PORTABLE INFORMATION HANDLING SYSTEMS

BACKGROUND OF THE INVENTION

1. Field of the Invention

The present invention relates to information handling systems and more particularly to smart cart to automatically manage portable information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One example of an information handling system is a notebook (or portable) type information handling system. It can often be challenging to manage notebook type information handling systems in organizations with multiple notebook type information handling systems. Education facilities are one example of an organization in which managing multiple notebook type information handling systems can be challenging. One known solution for managing multiple notebook type information handling systems is a notebook cart. Known notebook carts are typically relatively crude racks which to store multiple notebook type information handling systems for recharging.

Accordingly, it is desirable to provide a system for automatically managing a plurality of notebook type information handling systems.

SUMMARY OF THE INVENTION

In accordance with the present invention, a smart cart for automatically managing a plurality of information handling systems is set forth. In certain embodiments, the system provides a plurality of functions. For example, in certain embodiments, the system provides one or more of security authentication for distributing the notebooks, automatic asset tracking functionality; identification of notebook charge status; provides identification of asset information (e.g., an asset tag number, a serial number or a computer name); network access to push patch updates at night when units are not in use; and charging control to optimize system availability and prevent AC input circuit overload.

Such a system would be amenable for use within education facilities as well as within other organizations which manage multiple notebook type information handling systems such as healthcare type organizations,

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
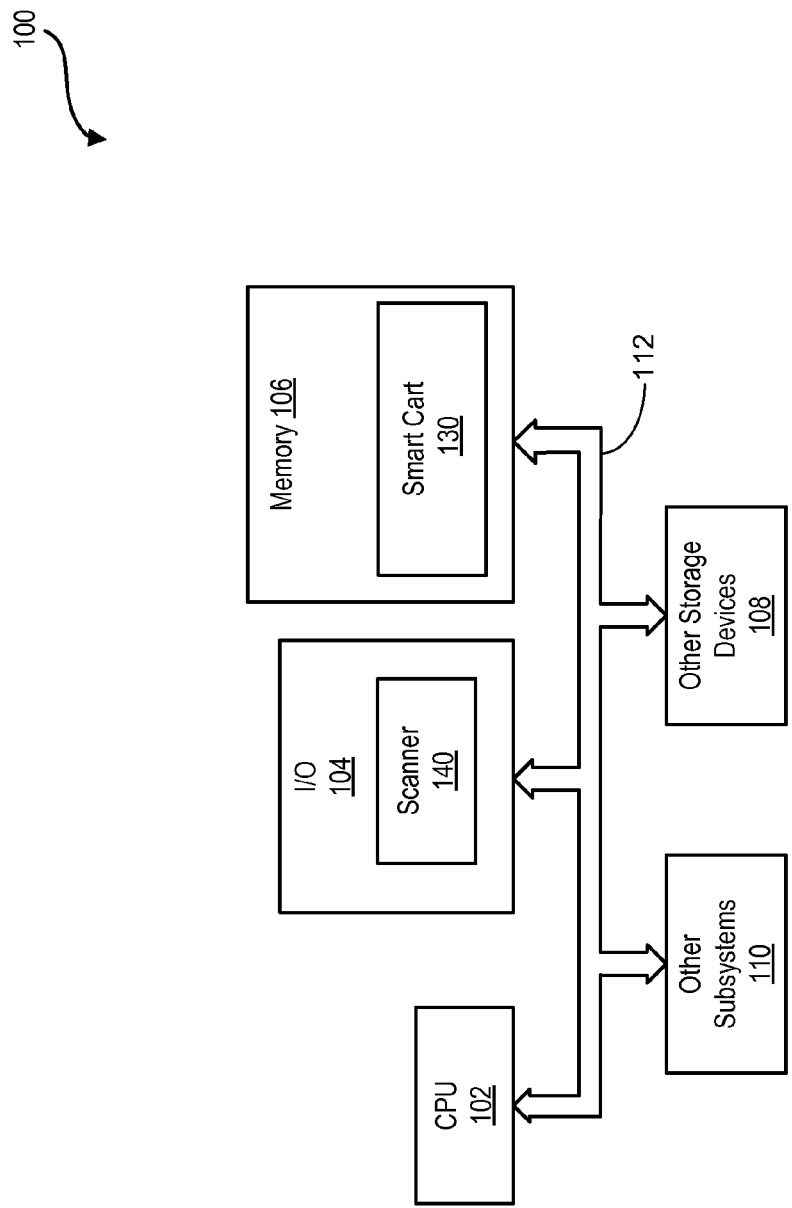
FIG. 1 shows a system block diagram of an information handling system.

Referring briefly to FIG. 1, a system block diagram of an information handling system 100 is shown. The information handling system 100 includes a processor 102, input/output (I/O) devices 104, such as a display, a keyboard, a mouse, and associated controllers (each of which may be coupled remotely to the information handling system 100), a memory 106 including volatile memory such as random access memory (RAM) and non-volatile memory such as a hard disk and drive, and other storage devices 108, such as an optical disk and drive and other memory devices, and various other subsystems 110, all interconnected via one or more buses 112.

In certain embodiments, the information handling system can include a smart cart application 130 stored on the memory 106. The smart cart application 130 includes instructions that are executable by the processor 102. Also, an example of an I/O device is a scanner 140, which may be a badge reader, a biometric type scanner or a barcode type scanner.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
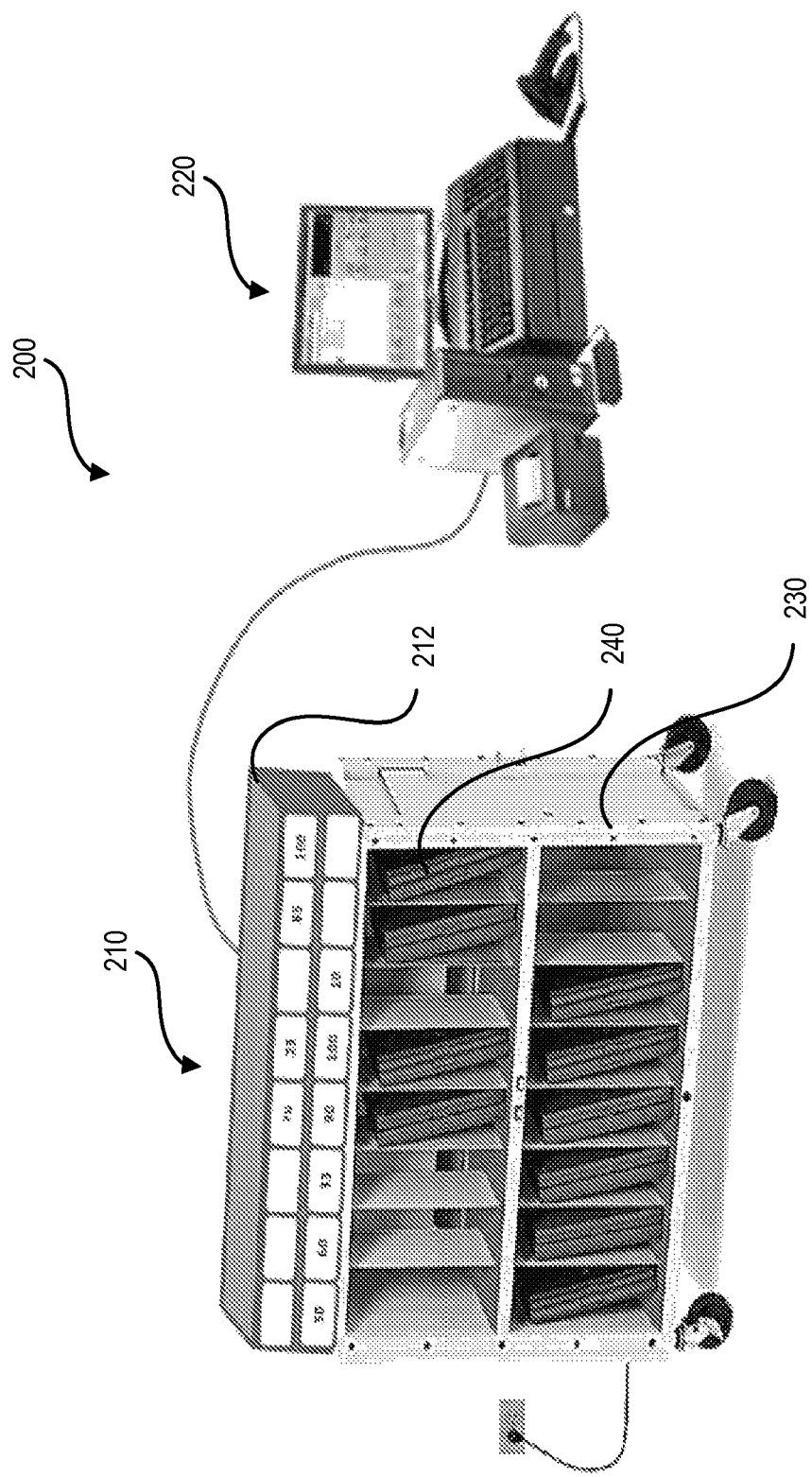
FIG. 2 shows a diagrammatic block diagram of a smart cart system to automatically manage portable information handling systems.

FIG. 2 shows a diagrammatic block diagram of a smart cart system 200 to automatically manage portable information handling systems. The smart cart system 200 includes a smart cart 210 and a charge controller 212 as well as a smart cart control center 220. The smart cart system provides an intelligent docking station array for a rack of notebooks. More specifically, the smart cart system 200 performs a plurality of functions including security authentication for distributing the notebooks, automatic asset tracking functionality; identification of notebook charge status; provides identification of asset information (e.g., an asset tag number, a serial number or a computer name); network access to push patch updates at night when units are not in use; and charging control to optimize system availability and prevent AC input circuit overload.

The charge controller 212, using battery capacity, charge status, and maximum charge rate controller system optimizes multisystem charge profiles to meet usage model demands such as maximizing number of systems with full charge or maximizing charge on at least "X" number of systems at a given expected pickup time. Additionally, between the charge controller 212 and the smart cart control center 220, the smart cart system tracks battery aging and prompts a user for replacement of worn out batteries.

The smart cart 210 includes a carousel of notebooks that are all docked within a dock array 230. This dock array 230 is coupled to a command center 220 that hosts a software application to manage the smart cart. As a user prompts the smart system (e.g., by swiping a badge or biometric reader) the system polls the notebooks in the rack to identify the notebook that is most fully charged. Upon identifying the unit to dispense, the command center 220 prompts that notebook to receive asset identification information. This asset identification information is matched with the user information and automatically entered into a tracking database along with time and date information. An indicator light on the smart cart 210 corresponding to the unit to be dispensed turns green and the unit is released.

The smart cart system 200 includes a communication link between command center 220 and the individual notebooks 240 in the dock array 230. The communication link allows the command center 220 to identify charge status of individual notebooks 240, to identify asset identification information of individual notebooks 240, to perform a hot plug detection operation (i.e., to recognize when a unit has been returned to the dock array 230) and to perform patch updates (e.g., operating system patch updates).

In certain embodiments, charge status identification, asset identification information identification and hot plug detection may be accomplished via a system management (SM) bus of a docking connector or via a one wire interface of a respective power barrel. The power barrel one wire interface may be the only connection for systems that in S4/S5 state that do not have docking connectors. Once system is running (e.g., power state SO) a wireless or wired LAN connection can enable high bandwidth updates such as operating system patch updates.

Figure 3A:
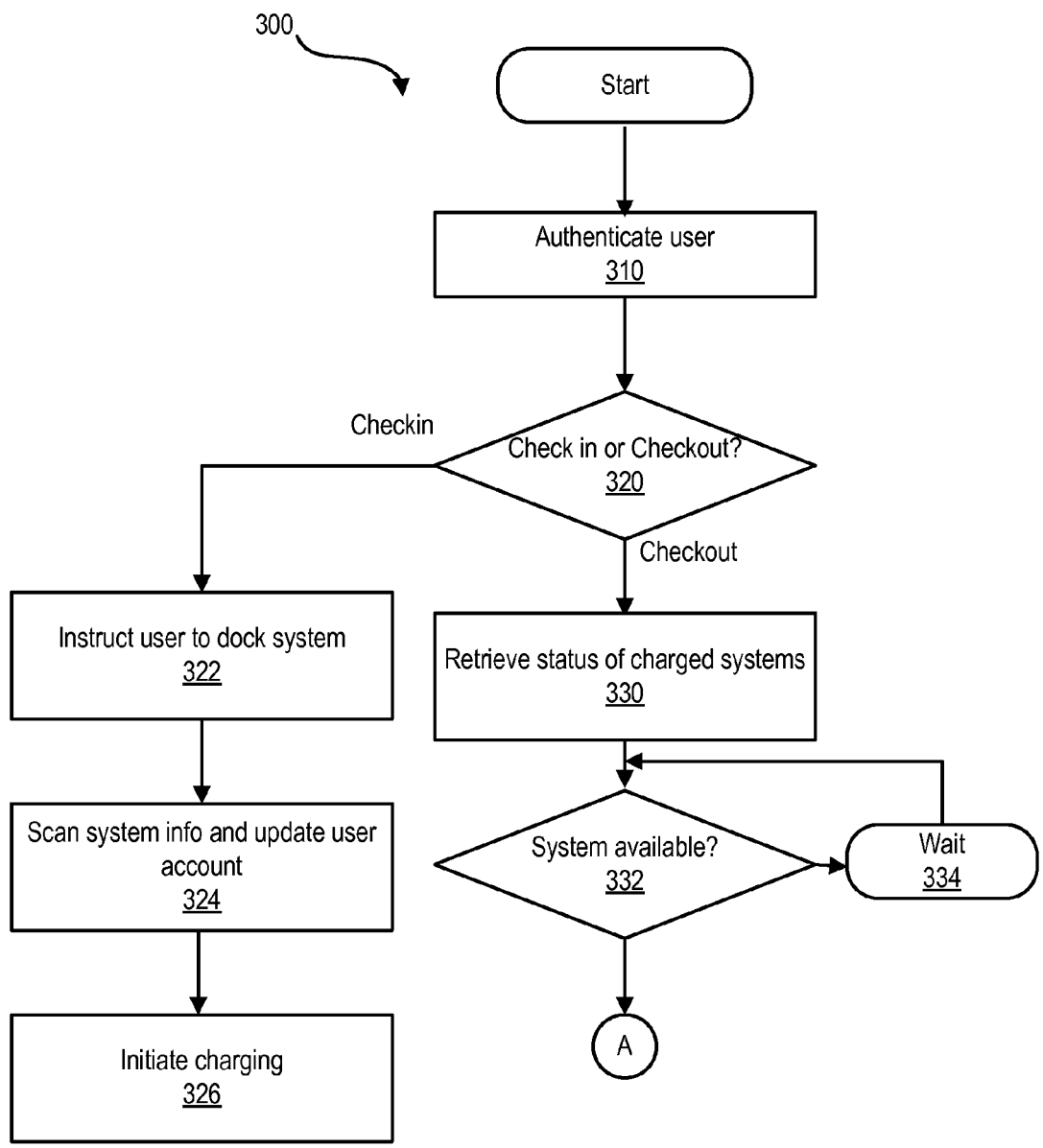
FIG. 3 shows a flow chart of the operation of a smart cart system to automatically manage portable information handling systems
Figure 3B:
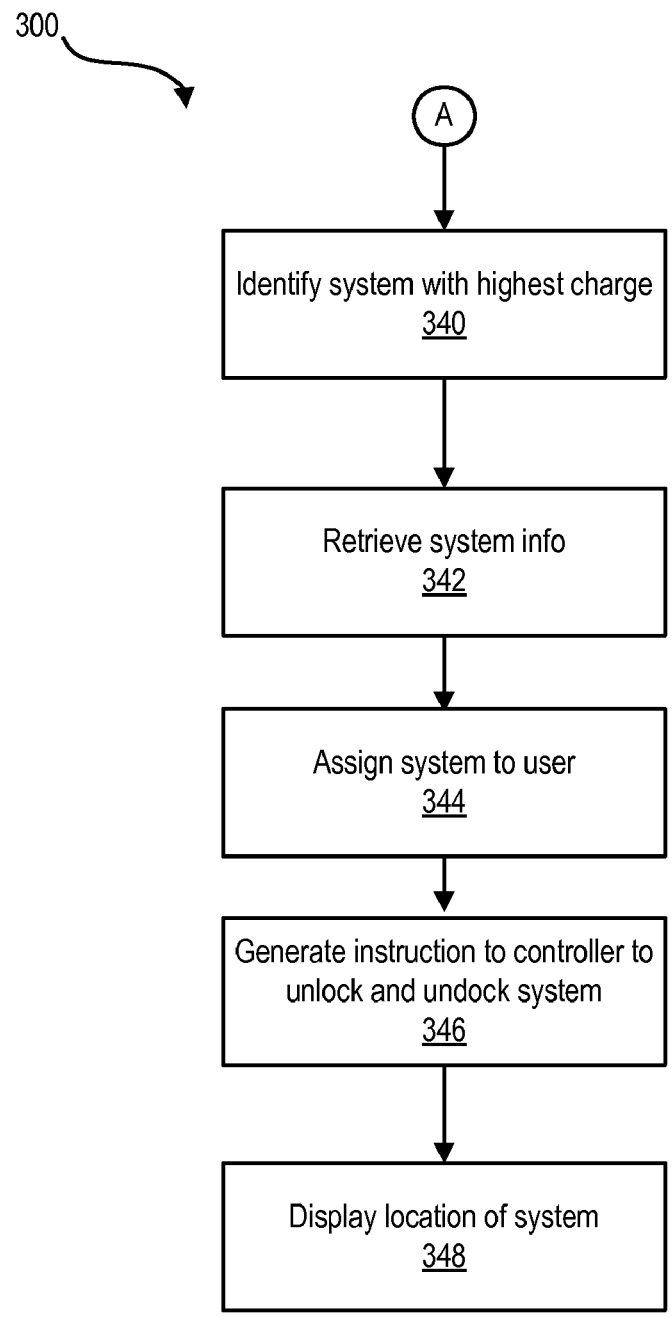

FIG. 3 shows a flow chart of the operation of a smart cart system 300 (such as smart cart application 130) to automatically manage portable information handling systems. More specifically, the smart cart system 300 starts operation by authenticating a user at step 310. Next at step 320, the system 300 determines whether the user wishes to check in a system or to check out a system.

If the user indicates a desire to check in a system, then the smart cart system 300 instructs the user to dock the system to a particular location within the cart array at step 322. Next, the system 300 scans the notebook for system information and updates the user account to indicate receipt of the notebook. This user account information may be stored within a asset management database stored within the control center 220. Next, the system 300 initiates charging of the notebook using the charge controller 212.

If the user indicates a desire to check out a system, then the smart cart system 300 accesses the charging controller 212 to retrieve the status of charges systems at step 330. Next, the smart cart system 300 determines whether any notebook systems are available at step 332. If no systems are presently available, then the smart cart system 300 waits at step 334 until a notebook system is available.

If there is at least one system available, then the smart cart system 300 identifies a notebook with the highest charge at step 340. Next, the smart cart system 300 retrieves the system information for the notebook system having the highest charge at step 342 and assigns the notebook system within the asset management database to the user at step 344. Next, the smart cart system 300 generates an instruction to unlock and undock the identified notebook system at step 346 and displays the location of the system that is being dispensed at step 348.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the cart, the charge controller and the control center may be coupled via a wireless communication medium.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. An apparatus for managing a plurality of information handling systems comprising:

a cart for holding the plurality of information handling systems;

a charge controller coupled to the cart;

a control center coupled to the cart and the charge controller, the cart, the charge controller and the control center providing an intelligent docking station for an array of information handling systems; and wherein the intelligent docking station provides security authentication for distributing the information handling systems, automatic asset tracking of the plurality of information handling systems; identification of information handling system charge status;

identification of asset information of the plurality of information handling systems;

network access to the plurality of information handling systems to facilitate updates to the plurality of information handling systems when the plurality of information handling systems are not in use;

and charging control to optimize information handling system availability and prevent AC input circuit overload.

2. The apparatus of claim 1 wherein:

the charge controller uses battery capacity, charge status, and maximum charge rate controller to optimize charge profiles to meet usage model demands.

3. The apparatus of claim 2 wherein:

the usage model demands maximize a number of information handling systems with full charge or maximizing charge on at least a predefined number of information handling systems for an expected pickup time.

4. The apparatus of claim 2 wherein:

the smart cart system tracks information handling system battery aging and prompts a user for replacement of worn out batteries.

5. The apparatus of claim 1, wherein: charge status identification, asset identification information identification and hot plug detection are accomplished via a system management (SM) bus of a docking connector or via a one wire interface of a respective power barrel.

6. The apparatus of claim 1 wherein:

the cart, the charge controller and the control center are coupled via a wireless communication medium.

7. An apparatus for managing a plurality of information handling systems comprising:

means for holding the plurality of information handling systems;

a charge controller coupled to the means for holding the plurality of information handling systems; and a control center coupled to the cart and the charge controller, the cart, the charge controller and the control center providing an intelligent docking station for an array of information handling systems; and wherein the intelligent docking station provides security authentication for distributing the information handling systems, automatic asset tracking of the plurality of information handling systems;

identification of information handling system charge status;

identification of asset information of the plurality of information handling systems;

network access to the plurality of information handling systems to facilitate updates to the plurality of information handling systems when the plurality of information handling systems are not in use;

and charging control to optimize information handling system availability and prevent AC input circuit overload.

8. The apparatus of claim 7 wherein:

the charge controller uses battery capacity, charge status, and maximum charge rate controller to optimize charge profiles to meet usage model demands.

9. The apparatus of claim 8 wherein:

the usage model demands maximize a number of information handling systems with full charge or maximizing charge on at least a predefined number of information handling systems for an expected pickup time.

10. The apparatus of claim 9 wherein:

the smart cart system tracks information handling system battery aging and prompts a user for replacement of worn out batteries.

11. The apparatus of claim 10 wherein:

charge status identification, asset identification information identification and hot plug detection are accomplished via a system management (SM) bus of a docking connector or via a one wire interface of a respective power barrel.

12. The apparatus of claim 7 wherein:

the cart, the charge controller and the control center are coupled via a wireless communication medium.

* * * * *